United States Patent [19]

Yoshino et al.

[11] Patent Number: 5,298,840
[45] Date of Patent: Mar. 29, 1994

[54] MOTOR CONTROL CIRCUIT AND MOTOR DRIVE SYSTEM USING THE SAME

[75] Inventors: Motoyasu Yoshino; Norio Fujii, both of Kyoto, Japan

[73] Assignee: Rohm Co., Ltd., Kyoto, Japan

[21] Appl. No.: 913,376

[22] Filed: Jul. 15, 1992

[30] Foreign Application Priority Data

Jul. 15, 1991 [JP] Japan ................................ 3-199997

[51] Int. Cl.⁵ .............................................. H02P 5/00
[52] U.S. Cl. .................................... 318/268; 318/254; 318/565
[58] Field of Search ............... 318/268, 138, 254, 439, 318/558, 565, 611, 615, 616, 617, 623, 624

[56] References Cited

U.S. PATENT DOCUMENTS

| | | |
|---|---|---|
| 4,371,819 | 2/1983 | Kaufmann . |
| 4,511,834 | 4/1985 | Studtmann ............................ 318/700 |
| 4,680,516 | 7/1987 | Guzik et al. ...................... 318/138 X |
| 4,780,773 | 10/1988 | Hama ...................................... 360/73 |

*Primary Examiner*—Bentsu Ro

*Attorney, Agent, or Firm*—Fay, Sharpe, Beall, Fagan, Minnich & McKee

[57] ABSTRACT

A motor control circuit which controls the speed of a motor so as to settle at a predetermined reference rotational speed based upon a detection signal dependent upon the rotating speed of the motor, and outputs to external devices a ready signal representing that the rotating speed of the motor has stabilized within a predetermined allowable range with respect to the reference rotational speed, includes a window pulse generating circuit which generates a window pulse having a width dependent upon a range of the generating period of the detection pulse generated in correspondence with the rotating speed within the allowable range; and a detection circuit which compares the window pulse and a detection pulse generated from the detection signal, detects either the window pulse or the detection pulse when the period of the detection pulse falls within a range of the period represented by the window of the window pulse and outputs the ready signal when the detection continues consecutively a plurality of times.

9 Claims, 5 Drawing Sheets

TRANSIENT CHARACTERISTIC OF MOTOR ROTATING SPEED

WAVEFORM DIAGRAMS IN COUNTER CIRCUIT

WAVEFORM DIAGRAMS FOR EXPLAINING THE OPERATION OF THE MOTOR CONTROL CIRCUIT

OUTPUT OF
HALL ELEMENT 1

DETECTION
PULSE P

MOTOR DRIVE
CIRCUIT OUTPUT
(DRIVE
   VOLTAGE)

MOTOR CONTROL CIRCUIT AND MOTOR DRIVE SYSTEM USING THE SAME

BACKGROUND OF THE INVENTION

1. Field of the Invention

The present invention relates to a motor control circuit and a motor drive system using the same, and more specifically relates to a motor control circuit which detects that the rotating speed of the motor is stabilized and outputs a so-called ready signal such as a read write enabling signal suitable for such as a floppy disk drive (FDD), a hard disk drive (HDD) and an opto-magnetic disk drive apparatus, and further relates to a motor drive system using the same.

2. Description of Related Art

FIG. 3 is a conventional control circuit for a three-phase motor.

The motor control circuit comprises a motor 1, a sensing circuit 2, an input amplifying circuit 3, a motor drive circuit 4 (hereinbelow called a drive circuit 4) and a ready signal generating circuit 5.

The sensing circuit 2 is constituted by three Hall elements 2a as its major components and generates a detection signal dependent upon the rotation of the motor to thereby detect the rotating speed or the rotating phase of the motor 1.

The input amplifying circuit 3 is constituted by three differential which amplify 5a as its major components, amplifies the detected signal (see FIG. 4(a)) received from the Hall elements 2a in the sensing circuit 2 and output the same as a detection pulse P (see FIG. 4(b)) after waveshaping with a logic circuit for example.

The drive circuit 4 comprises a torque control circuit for example, which, determines the rotating condition of the motor 1 upon receipt of the detection pulse P and produces a drive voltage having a waveform as shown in FIG. 4(c), causing a drive current which operates to bring back the motor rotation number to a reference rotation number based upon the determined rotating condition in order to drive the motor 1 at a constant rotating speed.

In the motor control circuit, the motor 1, the sensing circuit 2, the input amplifying circuit 3 and the drive circuit 4 constitute a feedback loop such that under a steady state condition the rotation of the motor 1 is kept stable at a predetermined target rotating speed. In the motor drive system using this control circuit, the motor 1 is at a standstill during the circuit settling time immediately after turning on the power source or during exchange of the recording medium. At these instances, the drive circuit 4 stops the motor 1 upon receipt of a stop signal S from a host controller for example. Namely, the drive circuit 4 prevents rotation of the motor 1 upon receipt of the stop signal, and when the stop signal is released the motor 1 is accelerated to rotate from the standstill condition. Thereby a transient condition with regard to the motor rotation is caused before the motor reaches a steady state condition rotating at a predetermined reference rotating speed.

During this transient condition, the rotating speed of the motor is not yet stabilized; therefore if one of many operations of a drive apparatus such as an FDD or an HDD, for example an accessing operation such as read/write of data on the recording medium which is fitted over the spindle of the motor 1 and is being rotated thereby, is performed, there arises a possibility of causing destruction of the recorded information on the recording medium or, further, causing destruction of the recording medium itself. For preventing such a possibility, the ready signal generating circuit 5 is provided in these kinds of motor control circuits.

The ready signal generating circuit 5 produces a ready signal K representing that the rotating speed of the motor 1 is stabilized, and outputs the same to an external device such as a host controller. When the host controller receives the ready signal K, the host controller treats the ready signal K as, for example, an enabling signal of read/write of data on the recording medium and initiates the read/write operation accordingly.

The ready signal generating circuit 5 delays by a predetermined time the release of the stop signal S, which has been applied from the host controller with a delay circuit 5a therein, and outputs the delayed timing signal as a ready signal K to thereby provide a predetermined waiting time for the operation of the host controller.

The predetermined delay time which produces the waiting time is determined by measuring the actual time required to stabilize the rotating condition of the motor in the drive device such (as an FDD or an HDD) after; starting the same and, further, by adding a margin in view of variability between drive devices. The determined waiting time is fairly longer than the measured time required until the motor rotation stabilizes.

In such a conventional ready signal generating method a ready signal is generated merely on expectation after waiting a predetermined time. Such method can not detect whether the motor actually reaches a stable rotating condition. In other words, even when the ready signal is received, it is not certain whether or not the motor rotation actually enters into a stable condition. Therefore, when the acceleration time of the motor is prolonged by some cause, no assurance is obtained that an accurate accessing operation can be performed. When an accessing operation to a recording medium is performed under an unstable condition, destruction of the recorded information or even destruction of the recording medium itself may be caused.

Further, in the conventional ready signal generating method, the delay time has had to be set fairly longer than the actual measured time. For this reason, it has taken time until an external device such as a controller would start an accessing operation for example, to several kinds of drive devices. As a result, response characteristics of the drive devices are reduced.

SUMMARY OF THE INVENTION

The motor control circuit according to the present invention, which controls the rotation of a motor so as to settle at a predetermined rotating speed based on a detection signal dependent upon the rotating speed of the motor and outputs to an external device a ready signal representing that the rotating speed of the motor stabilizes within a predetermined allowable range with respect to the predetermined reference rotating speed, comprises a window pulse generating circuit which generates a window pulse having a width dependent upon a range of the generating period of the detection signal corresponding to the rotating speed within the predetermined allowable range, and a detection circuit which compares the window pulse and the detection signal, detects either the window pulse or the detection signal when the period of the detection signal is within the range of the period represented by the window of the Window pulse and outputs the ready signal when the window pulse or the detection signal is consecutively detected a plurality of times.

The rotating speed of a motor generally converges toward a target rotating speed while fluctuating up and down with respect to the target rotating speed and gradually reducing the fluctuation amplitude with respect to the target rotating speed. As will be understood from the above explanation, when the width of the window pulse falls within the range of the generating period of the detection signal corresponding to the rotating speed within the allowable range with respect to the target rotating speed, and when the detection signals falling in this range are consecutively obtained, it is detected that the motor enters a stable rotating condition. Accordingly, the ready signal obtained from the detection circuit indicates that the motor has been rotated at a predetermined rotating speed for a predetermined time. Namely, the ready signal is generated when the rotation of the motor enters a stable condition.

Accordingly, the present invention monitors the rotating condition of the motor and generates a ready signal when the rotating condition is actually stabilized so that it is unnecessary to take into account the variability of motor performances. As a result, the motor control circuit according to the present invention eliminates the conventional necessity of providing an additional waiting time and can generate the ready signal with a short waiting time. Accordingly, with the present invention, a reliable ready signal can be outputted rapidly so that a motor control circuit or a motor drive system having an excellent response performance is realized.

Accordingly, an object of the present invention is to provide a motor control circuit which eliminates the necessity of taking into account the variability of motor performances and generates a ready signal with a short waiting time after the rotating speed of the motor surely reaches a stable condition.

Further, another object of the present invention is to provide a motor drive system having a high response characteristic which outputs a ready signal rapidly based on the detection signal dependent upon the rotating speed of the motor after the rotating speed of the motor reaches a stable condition.

DESCRIPTION OF THE PREFERRED EMBODIMENT

Figure 1:
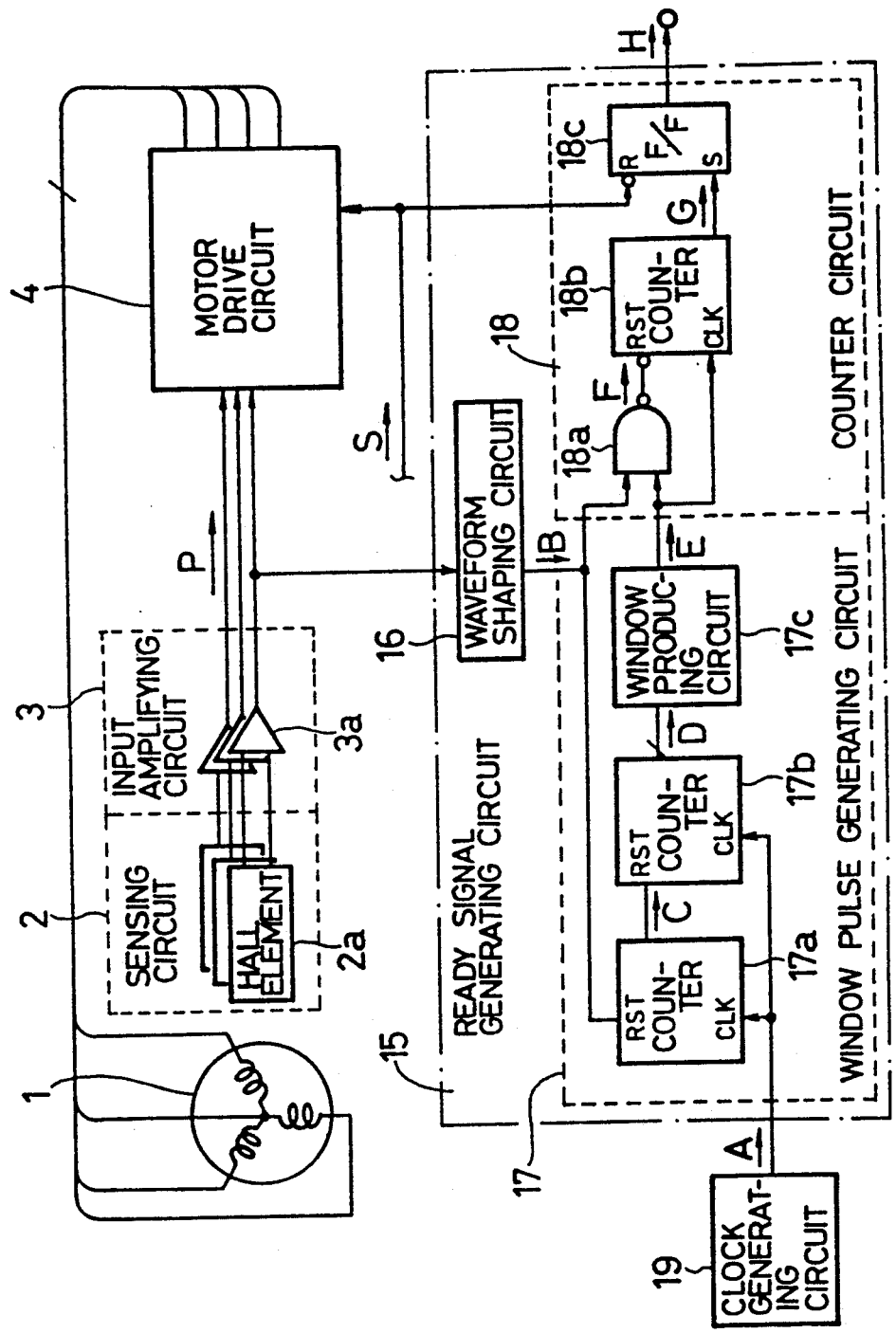
FIG. 1 is a circuit diagram for a three-phase motor control of one embodiment of the motor control circuit according to the present invention.
Figure 3:
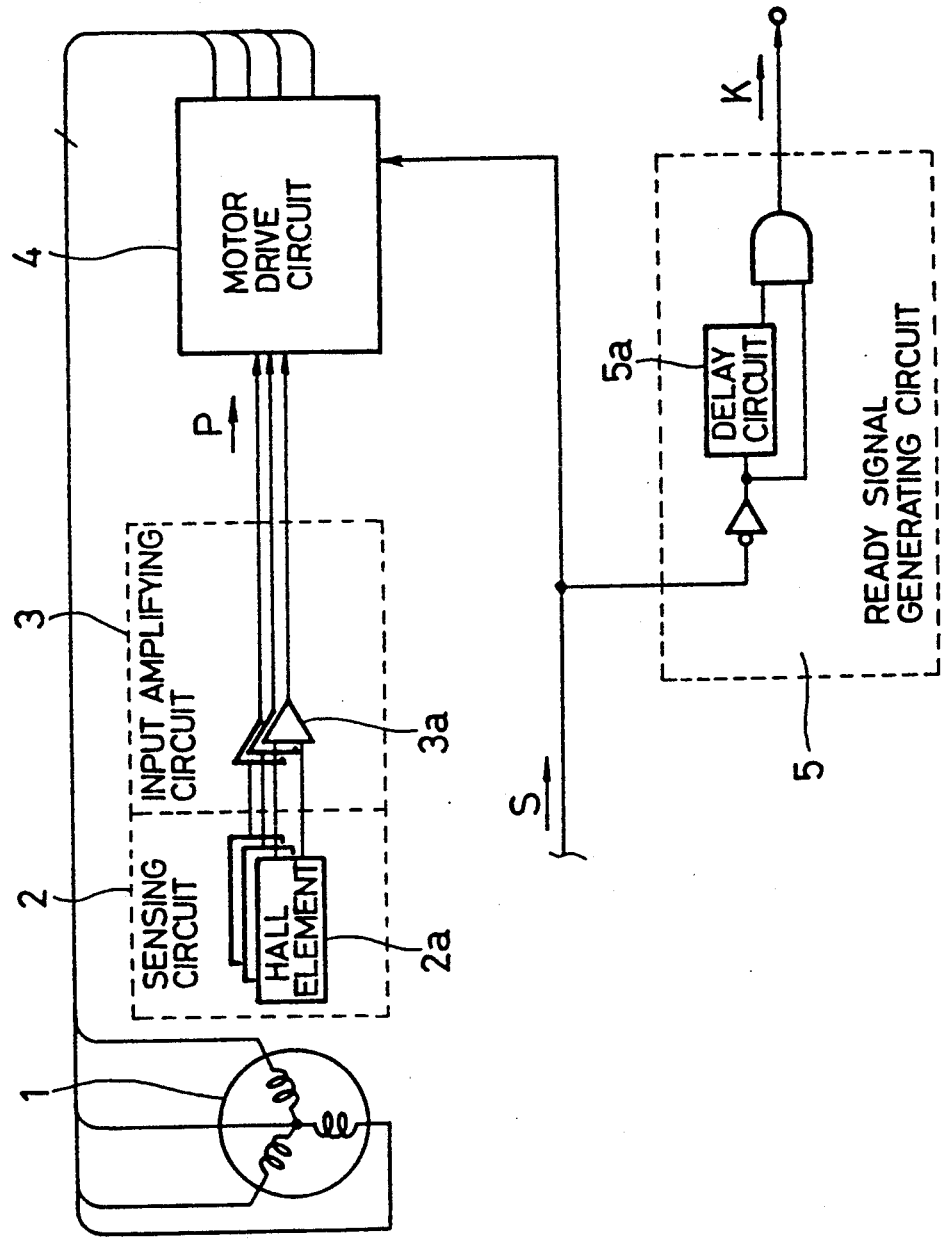
FIG. 3 is a circuit diagram of a drive control for a three-phase motor of a conventional motor control circuit.
Figure 4A:
FIGS. 4(a)-4(c) show waveforms for explaining the operation of the conventional motor control circuit as shown in FIG. 3.
Figure 4B:
Figure 4C:
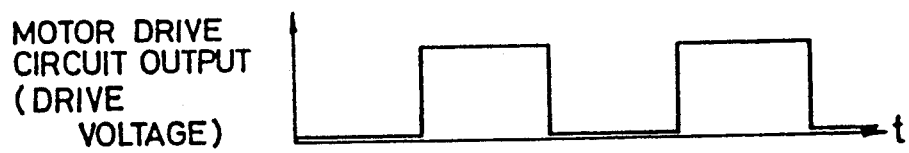

The motor control circuit as shown in FIG. 1 is provided with a ready signal generating circuit 15 in place of the ready signal generating circuit 5 in the conventional motor control circuit as shown in FIG. 3. The ready signal generating circuit 15 generates a ready signal upon receipt of a detection pulse P, and the generated ready signal is sent out to a host controller such as a CPU. The other circuits and the operations thereof are the same as the conventional ones and, under a steady state condition, the motor control circuit performs a drive control so that the motor 1 is maintained in a stable condition at a predetermined target rotating speed as explained previously.

The ready signal generating circuit 15 is constituted specifically by a waveform shaping circuit 16, a window pulse generating circuit 17 and a counter circuit 18.

Figure 2A:
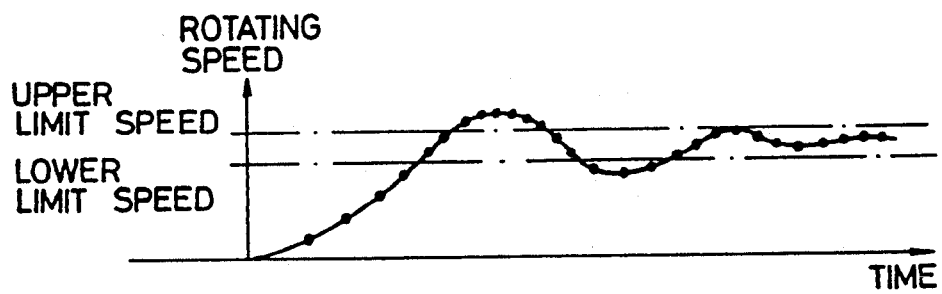
FIG. 2(a-2(c) shown waveform diagrams for explaining the operation of the motor control circuit as shown in FIG. 1, wherein 2(a) is a view for explaining a transient characteristic of the rotating speed of the motor until the motor reaches a target rotating speed after the motor is started, 2(b) shown timing waveforms in a counter circuit in the motor control circuit as shown in FIG. 1, and 2(c) shows timing waveforms in a window pulse generating circuit in the motor control circuit as shown in FIG. 1.
Figure 2B:
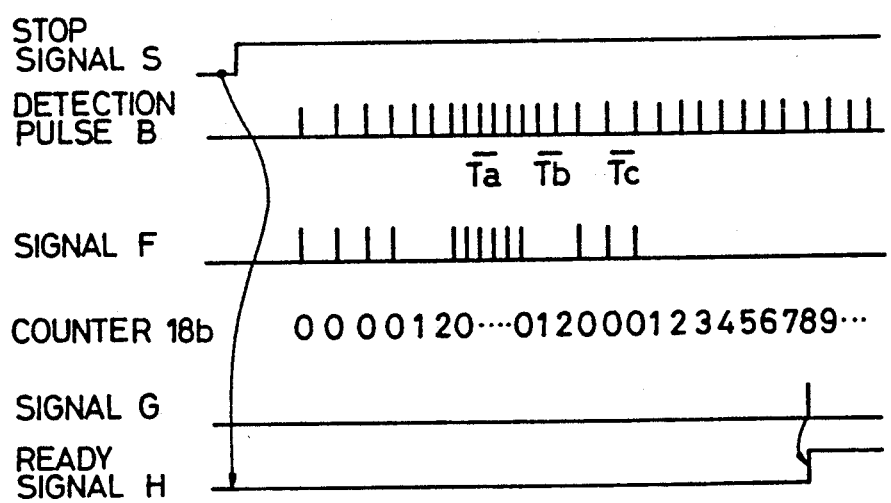
Figure 2C:
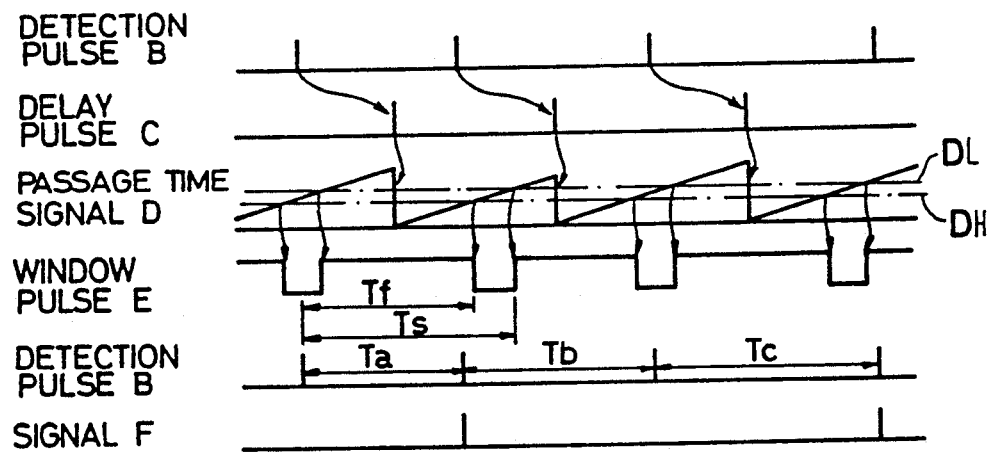

The waveform shaping circuit 16, upon receipt of a signal of a detection pulse P from the one phase among detection pulses from three phases, waveform-shapes the received signal and produces a detection pulse B (see pulse B in (b) and (c) of FIG. 2) in response to the leading edge or trailing edge of the waveform-shaped detection pulse. Further, a stop signal S as shown in (b) of FIG. 2 is significant at the LOW level (hereinbelow abbreviated as "L"). Moreover, when there exists a pulse corresponding to the detection pulse B among the pulses produced from the detection pulse P in a drive circuit 4, the waveform shaping circuit 16 may be eliminated and the corresponding pulse may be used as the detection pulse B.

The window pulse generating circuit 17 is constituted by a counter 17a, a counter 17b and a window producing circuit 17c, and produces a window pulse E (see (c) of FIG. 2) having a width and phase dependent upon an allowable rotating speed with respect to the target rotating speed based upon the detection pulse B.

Herein, the counter 17a serves to delay the timing of the detection pulse B by a predetermined time, and the delay time is measured by counting a base clock A outputted from a clock generating circuit 19 up to a predetermined value. The counter 17b starts measuring time upon receipt of the output from the counter 17a. The counter 17b, like the previous counter 17a, counts the base clock A and provides the passage of time after receiving the output from the counter 17a with the count value, and is reset by the subsequent output of the counter 17a and restarts the time measuring again. Thereby, the counter 17b measures time to the subsequent detection pulse B with reference to the generation of the present detection pulse B. For this purpose, the period of the base clock A is determined to be sufficiently small with respect to the rotation period of the motor 1 and is normally determined to be one several thousandth of the motor rotation period.

The operations of these circuits are explained hereinbelow, at first the counter 17a receives the detection pulse B at the reset input terminal RST to reset the count value, counts the base clock A received after the resetting and outputs a delay pulse C (see (c) of FIG. 2) when the count value reaches a predetermined value, i.e. a predetermined delay time. The counter 17b receives the delay pulse C at the reset input terminal RST to reset the count value while determining the reset time as the start timing, starts counting the base clock A and outputs the count value as a passage time signal D (see (c) of FIG. 2). The count value is reset by the subsequent delay pulse C.

The window producing circuit 17c is constituted by a comparator as its major component, and contains as its comparing values the respective count values corresponding to the allowable upper limit speed and lower limit speed with respect to a reference rotational speed of the motor 1, which is explained later, among the count values which the passage time signal D can take. Through the comparison of the passage time signal D with these comparing values, a binary window pulse E as shown in (c) of FIG. 2 is produced. The window pulse E is sent out from the window pulse generating circuit 15 to the counter circuit 18. Further, the ordinate of the passage time signal waveform as shown in (c) of FIG. 2 represents the count value.

The operation of the window pulse generating circuit 17 is explained in detail with reference to FIG. 2.

The counter 17a delays the detection pulse B by a predetermined time, and outputs a delayed detection pulse C.

The counter 17b is cleared of the count value upon receipt of the delayed detection pulse C, starts counting of the base clock A thereafter, and produces the passage time signal D as a saw tooth shape.

On one hand, as seen from (a) of FIG. 2, after starting the motor, or during rotation of the motor there usually exist an allowable upper limit speed and lower limit speed with respect to a reference rotational speed at which the motor is controlled to rotate and, when the rotating speed of the motor is maintained within the limits, the rotation of the motor is determined to be stable. The drive circuit 4 controls to drive the motor 1 so that the rotating speed falls in the predetermined range during driving of the motor.

The window producing circuit 17c respectively compares the passage time value DH selected in correspondence with the period TF of the detection pulse corresponding to the allowable upper limit speed, and the passage time value DL selected in correspondence with the period TS of the allowable lower limit speed with the previous passage time signal D, and converts the comparison result into a binary code. Namely, when the passage time signal D falls within a range defined between DH and DL, a signal of "L", for example, is generated, and when the passage time signal D i out of the range, a signal of HIGH level (hereinbelow abbreviated as "H") is generated. Thereby the window pulse E is produced and outputted.

The passage time signal D is cleared every time by the timing of the detection pulse C and the counter 17b restarts the time measurement. Since the rotating speed of the motor cannot be changed suddenly, there is no substantial problem even when the previous measured time value D is used as an evaluation reference of the timing for the subsequent detection pulse B. The same is true with respect to the periods prior and subsequent thereto which are judged with reference to the pulse width of the window pulse. Accordingly, the judgment of the relationship between the generation timing (period) of the subsequent detection pulse B and the timing (period) of the window pulse E produced with reference to the subsequent detection pulse B is substantially the same as the judgment of the relationship between the generation timing (period) of the subsequent detection pulse B and the timing (period) of the window pulse E produced with reference to one prior detection pulse B. The delay time set by the counter 17a is used for this purpose. With this delay time, both the subsequent detection pulse B and the window pulse E produced by the passage time signal D, which was measured with reference to one prior detection pulse B, can be located near the center of passage time signal D. Further, the delay time can take any value so long as the window pulse E is generated within the range of the passage time signal D and is set at the timing relationship corresponding to the detecting pulse B.

The window pulse is thus produced and, in comparison with the window pulse E, when the period of detection pulse B shows Ta (which is smaller than the limit value Tf) or shows Tc (which is larger than the limit value Ts), a reset signal F is outputted from a gate circuit 18a to a counter 18b which will be explained below. On the other hand, when the period of the detection pulse B shows Tb which is between the limit values Tf and Ts, no reset signal F is outputted.

A counter circuit 18 compares the window pulse E with the detection pulse B, detects either the window pulse E or the detection pulse B when the period of the detection pulse B is in a range of the period represented by the window of the window pulse E and, when such detection continues consecutively in a plurality of times, generates a ready signal. The counter circuit 18 is constituted by the gate circuit 18a, the counter 18b and a flip-flop 18c. The counter 18b counts the window pulse E which is generated with the timing of the detection pulse B. When the count value reaches, for example, "8", the ready signal H (see (b) of FIG. 2) is outputted. Further, whether the above counting operation is understood to count the window pulses E or to count the detection pulses B which fall within the range of the window pulse E is moot, so that both understandings are acceptable.

The gate circuit 18a, upon receipt of the detection pulse B and the window pulse E, outputs a reset signal F to the counter 18b to reset the same only when the detection pulse B falls out of the range of the window pulse E. When considering the detecting operation of the gate circuit 18a from another point of view, the gate circuit 18a compares the window pulse E with the detection pulse B and is adapted to detect that the period of the detection pulse B falls within the range of the period represented by the window of the window pulse E.

Now, the counter 18b which receives the reset signal F at the reset input terminal RST resets the count value and, when the window pulse E is received at the clock input terminal CLK, starts counting the window pulse E after the resetting, and when the count value reaches to a predetermined value, outputs a set signal G. The flip-flop 18c is reset when a stop signal S is received at the reset input terminal R, is set when a set signal G (see (b) of FIG. 2) is received at the set input terminal S after releasing of the stop signal S, and outputs a ready signal H.

Further, in the present embodiment, since the detection pulse B is determined as a positive logic, the window pulse E as a negative logic and the reset signal F as a negative logic, the gate circuit 18a can be a NAND gate. Still further, in a device wherein no stop signal is supplied from such as a host controller, it is preferable to constitute the flip-flop 18c to receive such as a "power on" reset signal at the reset input terminal R.

The general operation of the ready signal generating circuit 15 thus constituted is explained together with the rotating condition of the motor with reference to the respective waveform diagrams shown in FIG. 2.

At first, the uppermost waveform diagram in FIG. 2 illustrates a rotating speed characteristic during the speed building-up (transient condition) of the motor 1, wherein the abscissa represents the time and the ordinate represents rotating speed of the motor 1. Once the motor 1 is started, the rotating speed thereof is raised toward a target value through the control of the motor control circuit while repeating overshooting and undershooting with respect to the target value defined by the upper limit value and the lower limit value, gradually reducing the fractuation amplitude to settle between the upper limit rotating speed and the lower limit rotating speed, and finally converges to the target value. Further, for facilitating explanation hereinbelow, solid dots are added on the waveform to indicate the timing of the detection pulses B.

During the time when the ready signal generating circuit 15 is receiving the stop signal S, the flip-flop 18c is reset so that no ready signal H is outputted, and the motor 1 is stopped, and when the stop signal S is released, the motor 1 starts to rotate via the driving operation by the drive circuit 4.

In association with the rotation of the motor 1, the detection pulse B is produced and is sent out to the window pulse generating circuit 17 and the counter circuit 18.

The outputting period of the detection pulse B varies depending on the rotating speed of the motor 1 (see the detection pulse B in (b) of FIG. 2). Further, by producing the reset signal F in the gate circuit 18a in response to the window pulse E, the detection pulses B which do not correspond to the rotating speed between the allowable upper limit rotating speed and the allowable lower limit rotating speed with respect to the target rotational number are excluded from the detection pulses B.

The counter 18b is reset in response to the reset signal F and is cleared of the count value when the rotating speed of the motor 1 leaves the allowable range, and therefore measures the duration of the rotating speed within the allowable range by counting the window pulses E produced in response to the detection pulses B.

When the count value reaches a predetermined value ("8" in (a) of FIG. 2), the rotating speed fluctuation of the motor 1 is determined to converge to the allowable range and the set signal G is outputted. The flip-flop 18c is set upon receipt of the set signal G and thereafter outputs a ready signal so as to inform external devices that the rotation of the motor 1 has stabilized.

As explained above, by making use of the window pulse E the counter circuit 18 can rapidly output a reliable ready signal H representing that the rotation of the motor 1 has stabilized.

Further, the count value in the counter 18b can be selected to be any desirable number for the circuit design that is larger than the number determined, for example, by (the maximum value of the self-excitation period during starting of the motor 1 taking into account the variability)/(the period corresponding to the possible maximum speed)+(the quantization error by the base clock).

Further, in the embodiment, the width of the window pulse is selected within the range of the periods of the detection pulses corresponding to the allowable upper and lower rotating speeds with respect to the target rotating speed of the motor; however, since the present invention is constituted to generate the ready signal by successively counting the detection signals, the width of the window pulse can be modified to same extent, namely the pulse width near the range of the periods of the detection pulses corresponding to the allowable rotating speeds is acceptable, and the pulse width need not necessarily be the corresponding value.

We claim:

1. A motor circuit which controls a motor so as to rate at a reference rotating speed based on a detection signal dependent upon the rotating speed of the motor and outputs a ready signal representing that the rotating speed of the motor has stabilized within a predetermined allowable range with respect to the reference rotating speed, comprising:

a window pulse generating circuit which generates a window pulse having a width dependent upon a range of the generating period of the detection signal corresponding to the rotating speed in the allowable range; and a detection circuit which compares the window pulse with the detection signal, detects one of the window pulse and the detection signal when the period of the detection signal falls within a range of the period represented by the window of the window pulse, and outputs said ready signal when the detection continues consecutively a plurality of times.

2. A motor control circuit according to claim 1, wherein said window pulse generating circuit produces a window pulse upon receipt of a detection pulse generated from the detection signal, and said detection circuit is adapted to receive a stop signal from an external device and outputs the ready signal when the stop signal is released.

3. A motor control circuit according to claim 2, wherein said detection circuit includes a logic circuit which detects whether or not the period of the detection pulse falls within the range of the period represented by the window of the window pulse, and a counter which counts said one of the window pulse and the detection pulse based on the detection result of said logic circuit that the period of the detection pulse falls within the range of the period represented by the window of the window pulse, and when the detection result indicates that said period is out of the range of the period, the count value of the counter is reset upon receipt of the detection result; and when the count value of said counter reaches a predetermined value, said counter outputs the ready signal.

4. A motor control circuit according to claim 3, wherein said window pulse generating circuit includes a counter which is reset by the detection pulse and counts the time between the present detection pulse and the subsequent detection pulse, and a window pulse producing circuit which produces the window pulses having widths corresponding to upper and lower limit count values which are selected in count values of said counter dependent upon the range of the generating period of the detection pulse corresponding to the rotating speed within the allowable range.

5. A motor control circuit according to claim 3, wherein said window pulse generating circuit includes a delay circuit which receives the detection pulse as a first detection pulse and generates a second detection pulse delayed from the first detection pulse by a predetermined time, a counter which is reset by the second detection pulse and counts the time between the present second detection pulse and the subsequent second detection pulse and a comparing circuit which contains upper and lower count values from said counter selected dependent upon the range of the generating period of the rotating speed within the allowable range, compares the count value from said counter with the upper and lower count values, and generates the window pulse.

6. A motor control circuit according to claim 5, further comprising a waveform shaping circuit which generates a pulse in response to one of a leading edge and a trailing edge of the detection pulse upon receipt thereof, and a clock generating circuit, wherein said counter serves as a first counter and said delay circuit serves as a second counter which is reset by the pulse and counts the clock from said clock generating circuit up to a predetermined number, and a count completion signal from said second counter serves as the second detection pulse and wherein said first counter counts the clock from said clock generating circuit.

7. A motor control circuit which includes a speed signal generating circuit generating a rotating speed signal dependent upon the rotating speed of a motor, controls the rotating speed of the motor so as to settle at a reference rotational speed based on the rotating speed signal, and outputs to external devices a ready signal representing that the rotating speed of the motor has stabilized within a predetermined allowable range with respect to the reference rotational speed, comprising:
 a window pulse generating circuit which generates a window pulse having a width dependent upon a range of the generating period of the rotating speed signal corresponding to the rotating speed within the allowable range upon receipt of the rotating speed signal; and
 a counter circuit which compares the window pulse and a detection pulse generated from the rotating speed signal, detects one of the window pulse and the detection pulse when the period of the detection pulse falls within a range of the period represented by the window of the window pulse, counts the number of the consecutive detections and outputs a ready signal when the consecutive count number reaches a predetermined value.

8. A motor control circuit, comprising:
 a detection signal generating circuit which generates a detection signal dependent upon the rotating speed of a motor;
 a control circuit which controls the rotating speed of the motor so as to settle at a reference rotating speed based upon the detection signal;
 a window pulse generating circuit which generates a window pulse having a width dependent upon a range of the generating period of the detection signal corresponding to the rotating speed within an allowable range upon receipt of the detection signal;
 a comparing circuit which compares the window pulse and a detection pulse generated from the detection signal;
 a detection circuit which detects one of the window pulse and the detection pulse dependent upon the comparison result from said comparing circuit when the period of the detection pulse falls within a range of the period represented by the window of the window pulse; and
 a counter circuit which is adapted to receive a stop signal, counts the number of consecutive detections from said detection circuit and outputs a ready signal representing that the rotating speed of the motor has stabilized when the count number has reached a predetermined value and the stop signal is released.

9. A motor drive system, comprising:
 a motor;
 a detection signal generating circuit which generates a detection signal dependent upon the rotating speed of said motor;
 a control circuit which controls the rotating speed of the motor so as to settle at a reference rotating speed based upon the detection signal;
 a window pulse generating circuit which generates a window pulse having a width dependent upon a range of the generating period of the detection signal corresponding to the rotating speed within an allowable range upon receipt of the detection signal;
 a comparing circuit which compares the window pulse and a detection pulse generated from the detection signal;
 a detection circuit which detects one of the window pulse and the detection pulse dependent upon the comparison result from said comparing circuit when the period of the detection pulse falls within a range of the period represented by the window of the window pulse; and
 a counter circuit which is adapted to receive a stop signal, counts the number of consecutive detections from said detection circuit and outputs a ready signal representing that the rotating speed of said motor has stabilized when the count number has reached a predetermined value an the stop signal is released.

* * * * *